J. W. LEDOUX.
FLUID METER.
APPLICATION FILED APR. 20, 1906.

902,888.

Patented Nov. 3, 1908.
2 SHEETS—SHEET 1.

WITNESSES:

INVENTOR
John W. Ledoux
BY
Chas. N. Butler
ATTORNEY.

J. W. LEDOUX.
FLUID METER.
APPLICATION FILED APR. 20, 1906.

902,888.

Patented Nov. 3, 1908.
2 SHEETS—SHEET 2.

WITNESSES:

INVENTOR
John W. Ledoux
BY
Charles N. Butler
ATTORNEY

UNITED STATES PATENT OFFICE.

JOHN W. LEDOUX, OF SWARTHMORE, PENNSYLVANIA, ASSIGNOR TO SIMPLEX VALVE & METER COMPANY, OF CAMDEN, NEW JERSEY, A CORPORATION OF NEW JERSEY.

FLUID-METER.

No. 902,888.     Specification of Letters Patent.     Patented Nov. 3, 1908.

Application filed April 20, 1906. Serial No. 312,787.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

This invention is a fluid meter having improved means for effecting the differential movement of a register or indicator, the improvements comprising a wheel rotated by fluid pressure under control of an escapement and mechanism coöperating therewith to operate the register or indicator.

Figure 1:
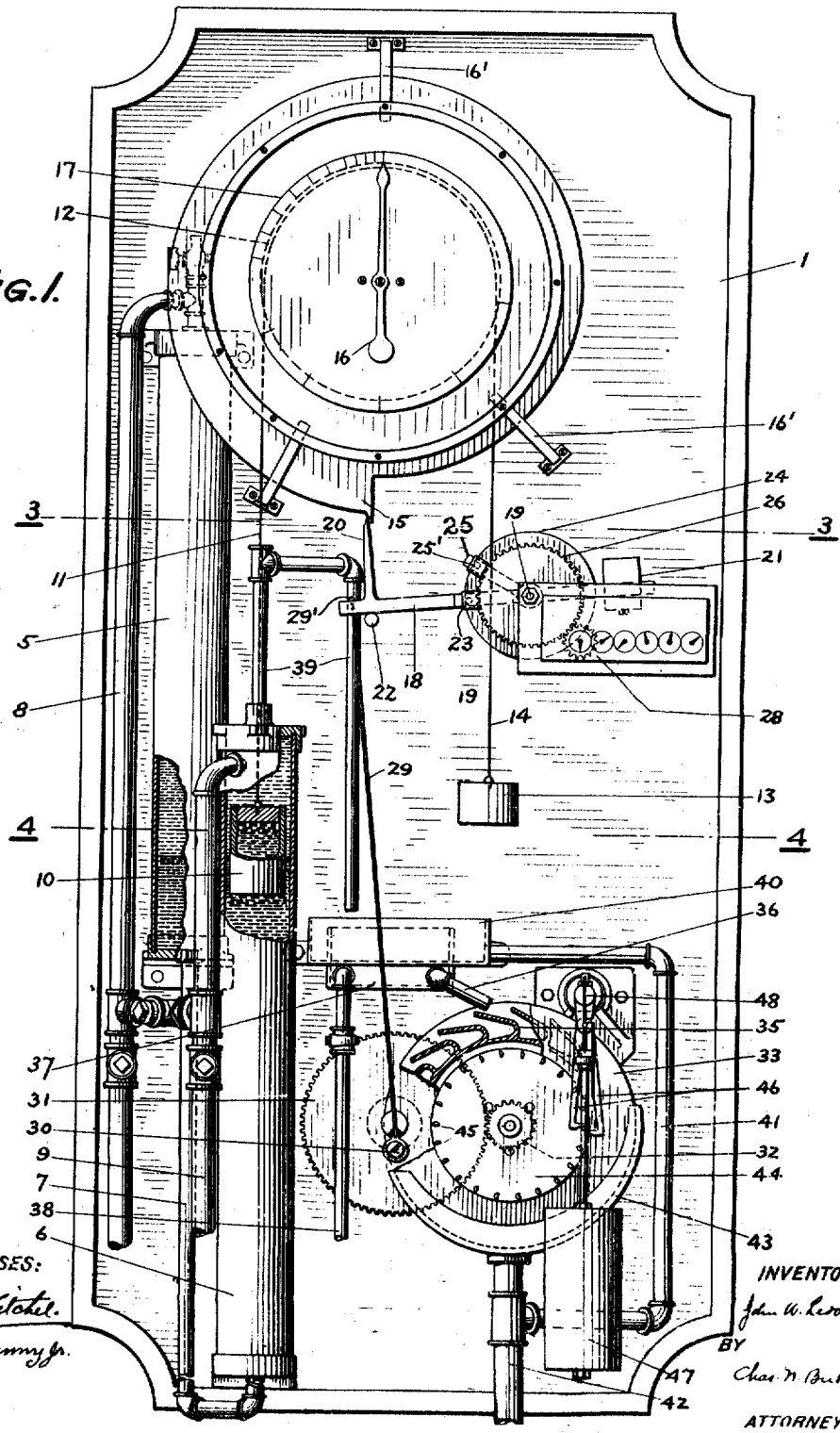
Figure 2:
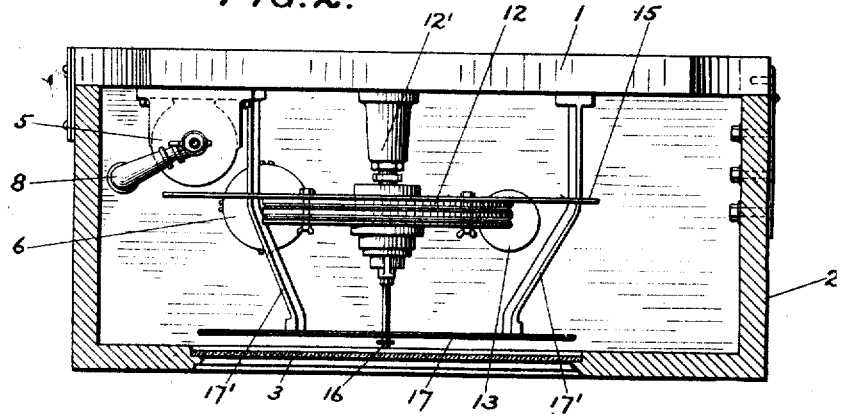
Figure 3:
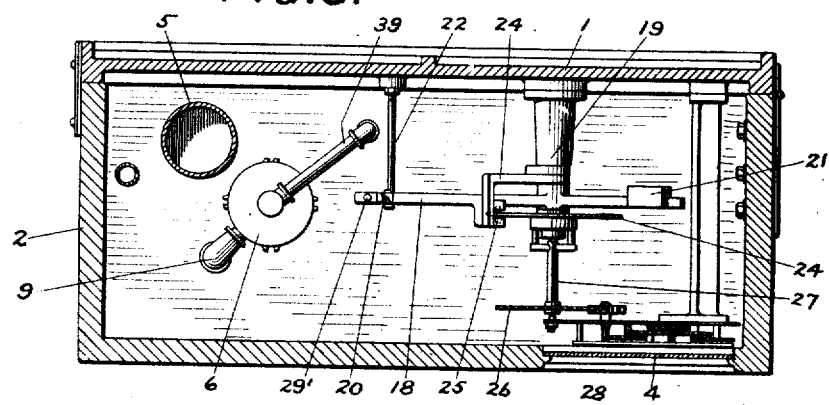
Figure 4:
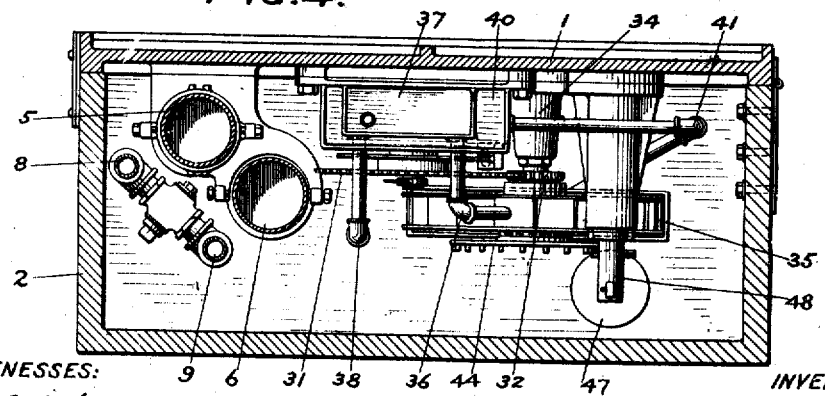

In the drawings, Figure 1 represents an elevation of the invention with the casing removed, Fig. 2 is a top plan view showing the casing in section, Fig. 3 is a sectional view taken on the line 3—3 of Fig. 1, and Fig. 4 is a sectional view taken on the line 4—4 of Fig. 1.

The apparatus comprises the base 1 and the closure 2 with the sight glasses 3 and 4 therein.

The base supports the chambers 5 and 6, having their bottoms connected by the tube 7 and their tops connected with the respective tubes 8 and 9 for communicating pressure of a liquid at the normal and contracted sections of a conduit to a heavier liquid contained in the chambers. A float 10, in the chamber 6, is suspended by a cord or wire 11 from a drum or disk 12 which is journaled on a bearing 12′ carried by the base, the part 11 working through a small passage in the other wise closed top of the chamber 6. The float is counter-balanced by a weight 13 connected by a cord or wire 14 with the drum or disk.

A cam 15 and a pointer 16 are fixed to the drum and are revolved therewith proportionately to the movement of the float due to variations in the height of the column of liquid supporting it, the latter varying with variations in the resultant pressure exerted upon such liquid by the lighter liquid in the chambers 5 and 6. The pointer travels over the dial 17, supported by the brackets 17′, to indicate the rate of flow at any given instant.

A lever 18 oscillating on the bearings 19 is provided with a tappet 20 which makes contact with the cam, due to the action of the lever's counter-weight 21. The upward movement of the tappet is thus varied by the position of the cam and its lower movement is limited by a fixed stop 22. The oscillating lever acts through a clutching device 23 upon a disk 24 revoluble about the axis of the lever, so that the disk is advanced through the lever's arc of movement in one direction and remains stationary during the lever's movement in the opposite direction, a stationary arm 25 with the clutch 25′ preventing the reverse movement of the disk.

A spur wheel 26 is fixed to the disk 24 by a shaft 27 and actuates a register 28 by steps proportional to the arcs of oscillation of the lever 18.

To move the tappet lever 18 to the limit of its stroke away from the cam, a pitman or connecting rod 29 with an enlargement 29′ on its upper end plays freely in its upward movement through the end of the lever and in its downward movement engages the lever so as to carry it against the limiting stop 22. The pitman rod is operated by its eccentric pivotal connection 30 with a spur-wheel 31 revolving at a regular rate.

To revolve the spur wheel 31 it is geared to a pinion 32 fixed to a vane wheel 33, the pinion and vane wheel revolving on the bearing 34. The vanes 35 of the wheel 33 receive the impact of fluid discharge by a nozzle 36 from a vessel 37.

To cause a regular rate of revolution of the vane wheel, it is subjected to a regular rate of discharge from the nozzle 36 induced by a uniform head, which is provided by the discharge into the vessel 37 from a supply pipe 38 and the drip pipe 39 (for the fluid escaping from the chamber 6) so as to keep this vessel constantly filled. The overflow from the basin 37 is received by the basin 40 which discharges by the pipe 41 to the waste pipe 42, while the discharge from the vane wheel is collected by the catch basin 43 which empties into the pipe 42.

To secure the isochronous movement of the register actuating mechanism, the vane wheel 33 has secured thereto a pin wheel 44 whose pins 45 engage the pallets 46 alternately, the pallets being connected with and oscillating a pendulum 47 carried by the support 48, and the revolution of the wheel being thus under control of an escapement.

The vane wheel with the mechanism connected therewith may be used, under other conditions, to measure an irregular flow through the nozzle 35 by providing a fixed arc of oscillation for the lever 18, as by fixing the cam in the requisite position, when the mechanism would operate to indicate the sum of the revolutions of the wheel through its various rates due to the varying rate of delivery thereto from the nozzle.

Having described my invention I claim:

1. An apparatus of the class described comprising a revoluble vane wheel, a vessel having means for discharging a fluid to said wheel under a constant head, an escapement for controlling the revolutions of said wheel, mechanism operated by said wheel, an indicating device operated step by step through the action of said mechanism, and means whereby a liquid column regulates the rate of said indicating device.

2. An apparatus of the class described comprising a vane wheel, a gear wheel fixed thereto, a second gear wheel engaged by said first gear wheel, a rod having an eccentric connection with said second gear wheel, a lever with which said rod is connected, an indicating mechanism, and mechanism connecting said lever and indicating mechanism.

3. An apparatus of the character described comprising a vane wheel, an indicating mechanism connected therewith and operated thereby, a pin wheel escapement connected to said vane wheel and controlling its movement, a basin having means for discharging a fluid against said vane wheel, means for maintaining a constant head in said basin, a liquid chamber, a device movable in said chamber, and mechanism whereby the position of said device regulates the rate of said indicating mechanism.

4. An apparatus of the character described comprising a vane wheel, means for discharging a fluid under a constant head against said wheel, an escapement for controlling the movements of said wheel, gearing operated by said wheel, a connecting rod operated by said gearing, an oscillating lever operated by said rod, a cam for regulating the oscillations of said lever, and a register connected with and operated by said lever.

In testimony whereof I have hereunto set my hand this 14th day of April, A. D. 1906, in the presence of the subscribing witnesses.

JOHN W. LEDOUX.

Witnesses:
    CHARLES N. BUTLER,
    CARLYLE H. ROSS.